United States Patent
Chiou et al.

(10) Patent No.: US 7,113,788 B1
(45) Date of Patent: Sep. 26, 2006

(54) METHOD AND APPARATUS FOR NETWORK FORMATION

(75) Inventors: Wayne W. Chiou, Sunrise, FL (US); Vernon A. Allen, Fort Lauderdale, FL (US); Oleg Andric, West Palm Beach, FL (US); Ralph L. D'Souza, Sunrise, FL (US); Minh T. Pham, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/074,910

(22) Filed: Mar. 8, 2005

(51) Int. Cl.
  *H04Q 7/20*  (2006.01)
(52) U.S. Cl. .................. 455/445; 455/452.1; 455/453; 370/238; 370/400
(58) Field of Classification Search ................ 455/445, 455/452.1, 452.2, 453, 41.2, 502; 370/238, 370/254, 400
  See application file for complete search history.

(56) References Cited

U.S. PATENT DOCUMENTS

| | | | |
|---|---|---|---|
| 2003/0055892 A1* | 3/2003 | Huitema et al. ............ 709/204 |
| 2003/0060202 A1* | 3/2003 | Roberts ...................... 455/445 |
| 2004/0076164 A1* | 4/2004 | Vanderveen et al. ........ 370/400 |
| 2004/0192221 A1* | 9/2004 | Matsunaga .................... 455/76 |
| 2004/0218548 A1* | 11/2004 | Kennedy et al. ............ 370/254 |
| 2004/0219909 A1* | 11/2004 | Kennedy et al. ......... 455/422.1 |
| 2005/0037787 A1* | 2/2005 | Bachner et al. ............. 455/502 |
| 2005/0086384 A1* | 4/2005 | Ernst .......................... 709/248 |
| 2005/0094594 A1* | 5/2005 | Roh ........................... 370/328 |
| 2005/0174950 A1* | 8/2005 | Ayyagari .................... 370/254 |
| 2005/0254429 A1* | 11/2005 | Kato et al. .................. 370/238 |

OTHER PUBLICATIONS

Radhakrishnan et al., "Protocol for Dynamic Ad-Hoc Networks Using Distributed Spanning Trees", Wireless Networks 9, (2003), pp. 673-686.

* cited by examiner

*Primary Examiner*—Joseph Feild
*Assistant Examiner*—Huy Nguyen

(57) ABSTRACT

When a requesting node (402) has routing capabilities and attempts to join a network and there are no association slots available, the requesting node (402) will send an association message to a potential root node (401). If the root node (401) has reached the maximum number of links, and has a non-routing capable node (403) associated with it, the root node (401) will send a message to the non-routing capable node (403), instructing it to disassociate and attempt to re-associate at a later time. A message is then sent to the requesting node (402) for it to associate with the root node (401).

16 Claims, 4 Drawing Sheets

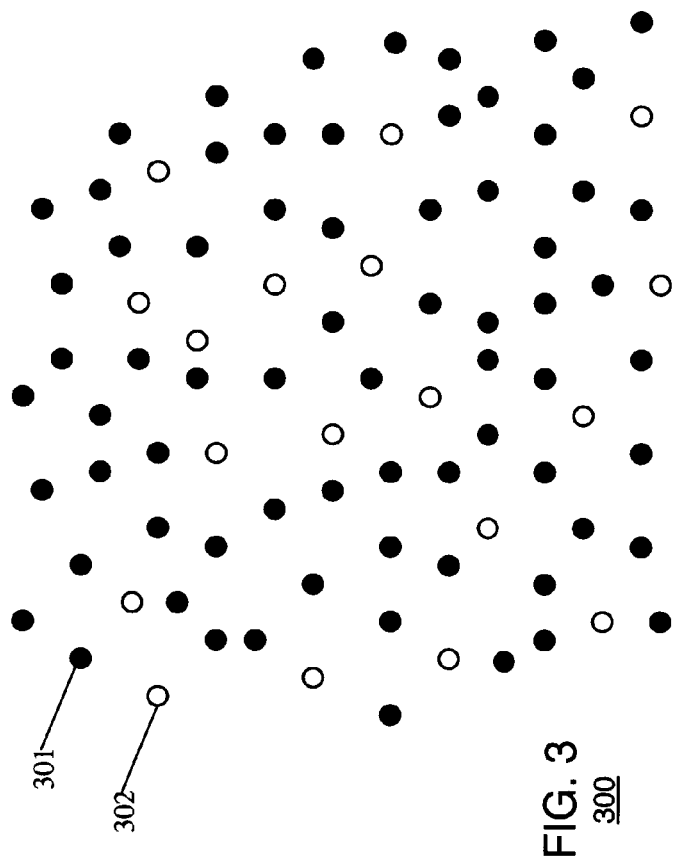
FIG. 3
300
● Routing Node
○ Non-Routing Node
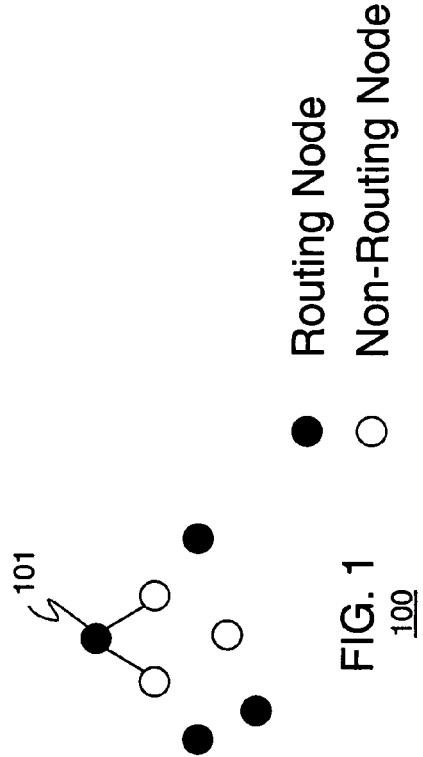
FIG. 1
100
FIG. 2
100

500

METHOD AND APPARATUS FOR NETWORK FORMATION

FIELD OF THE INVENTION

The present invention relates generally to network formation and in particular, to a method and apparatus for ad-hoc network formation.

BACKGROUND OF THE INVENTION

In a wireless network with routing capable and non-routing capable nodes, it is possible that non-routing capable nodes will prevent additional nodes from joining the network. More particularly, since nodes within an ad-hoc communication system may have a maximum number of connections to other nodes, if non-routing nodes join the network before the routing nodes, then the maximum number of nodes capable of joining the network may be limited. This is illustrated in FIG. 1.

As shown in FIG. 1 network 100 has formed with two non-routing nodes 102 connected to routing node 101. As is evident, if all routing capable nodes can only support 2 associated nodes and two non-routing capable nodes join first to the root node, then this network can only support a maximum of 3 nodes. On the other hand, if two routing capable nodes join the root node then this network can support at least 7 nodes (FIG. 2). Therefore a need exists for a method and apparatus for forming a network that prevents non-routing nodes from limiting the number of nodes that can join a network.

BRIEF DESCRIPTION OF THE DRAWINGS

FIG. 1 is a block diagram illustrating network formation.
FIG. 2 is a block diagram illustrating network formation.
FIG. 3 is a block diagram of an ad-hoc network.

DETAILED DESCRIPTION OF THE DRAWINGS

Figure 4:
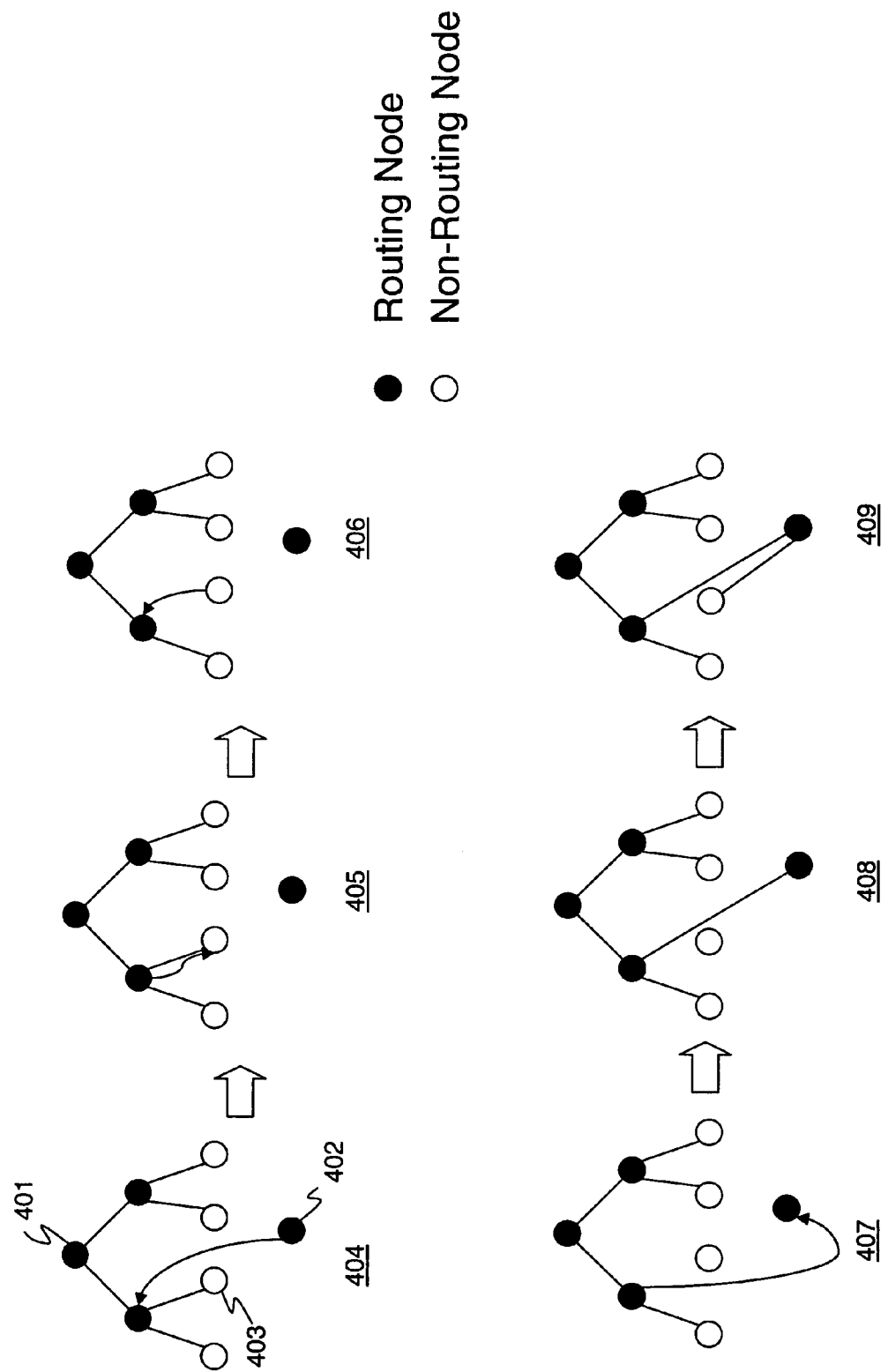
FIG. 4 is a block diagram of an ad-hoc network illustrating network formation.

In order to address the above-mentioned need, a method and apparatus for network formation is provided herein. When a requesting node has routing capabilities and attempts to join a network and there are no association slots available, the requesting node will send an association message to a potential root node. If the root node has reached the maximum number of links, and has a non-routing capable node associated with it, the root node will send a message to the non-routing capable node, instructing it to disassociate and attempt to re-associate at a later time. A message is then sent to the requesting node for it to associate with the root node. This will result in a net increase of available association slots for the other nodes to associate to the network. If the root node does not have non-routing capable nodes associated to it, a refusal message is sent to the requesting node. The requesting node will then repeat the query with other potential root nodes until it can associate with the network.

The present invention encompasses a method for network formation. The method comprises the steps of receiving a request to form a communication link with a requesting node and determining if a maximum number of links has been achieved. In response to the request to form the link and the determination, communication to a non-routing node is broken and a communication link is formed with the requesting node.

The present invention additionally encompasses a method for network formation. The method comprises the steps of receiving a request to form a communication link with a requesting node, determining if a maximum number of links has been achieved, determining if the requesting node is a routing node, and determining if any associated nodes are non-routing nodes. In response to the determinations, communication to a non-routing node is broken and a communication link with the requesting node is formed.

The present invention additionally encompasses an apparatus comprising a receiver receiving a request to form a communication link with a requesting node, and logic circuitry determining if a maximum number of links has been achieved and in response to the request to form the association link and the determination, disassociating communication with a non-routing node and forming a communication link with the requesting node.

Turning now to the drawings, wherein like numerals designate like components, FIG. 3 is a block diagram of network 300. Network 300 preferably utilizes a communication system protocol defined by the 802.15.3 Wireless Personal Area Networks for High Data Rates standard, or the IEEE 802.15.4 Low Rate Wireless Personal Area Networks standard. One of ordinary skill in the art will recognize that other communication system protocols may be utilized without varying from the scope of the invention. For example, communication system 100 may utilize communication system protocols such as, but not limited to, Ad-hoc On Demand Distance Vector Routing (AODV), Dynamic Source Routing (DSR), Temporally-Ordered Routing Algorithm (TORA), Bluetooth™ standard (IEEE Standard 802.15.1), . . . , etc.

As shown, network 300 includes a number of routing nodes 301 and non-routing nodes 302. Nodes 301–302 represent devices that communicate with each other through wireless communication, and can be transportable (mobile) or they can be fixed in a given place. Nodes 301–302 can include, for example, transceiver security tags attached to valuable assets such as lap top computers, or be embedded in wireless communication devices including cellular telephones.

During operation of network 300, nodes become associated with each other for routing purposes, with transmissions between two nodes generally taking place through intervening nodes. The intervening nodes receive a source transmission, and "repeat" the source transmission until the source transmission reaches its destination node. As discussed above, many networks comprise nodes that are incapable of routing data. If a non-routing node 302 joins network 300 before a routing node 301, then the maximum number of nodes capable of joining the network may be limited. In order to address this issue, when a node receives a request for association, the node will attempt to associate the requesting node. If, however, the node has reached a maximum number of links, the node will be unable to associate the requesting node. In this situation, the node will determine if the requesting node is a routing node and if any associated node is a non-routing node. If both conditions are true, the non-routing node will be disassociated and replaced by the requesting node. This procedure is illustrated in FIG. 4.

As shown in FIG. 4, node 402 requests an association with node 401 at time period 404. If the maximum number of links for this network is two, then the association cannot be completed since node 401 has two existing links. If node 401 determines that node 402 is capable of routing, and that an associated node (e.g., node 403) is a non-routing node, then a non-routing node is forced to disassociate with node 401. This is accomplished by node 401 sending a disassociation message to non-routing node 403 at time period 405. In response, node 403 disassociates with node 401 at time period 406, and an "OK to associate" message is sent to node 402 at time period 407. At time period 408 node 402 associates with node 401. Finally at time period 409, node 403 tries to join the network again, and associates with node 402.

Figure 5:
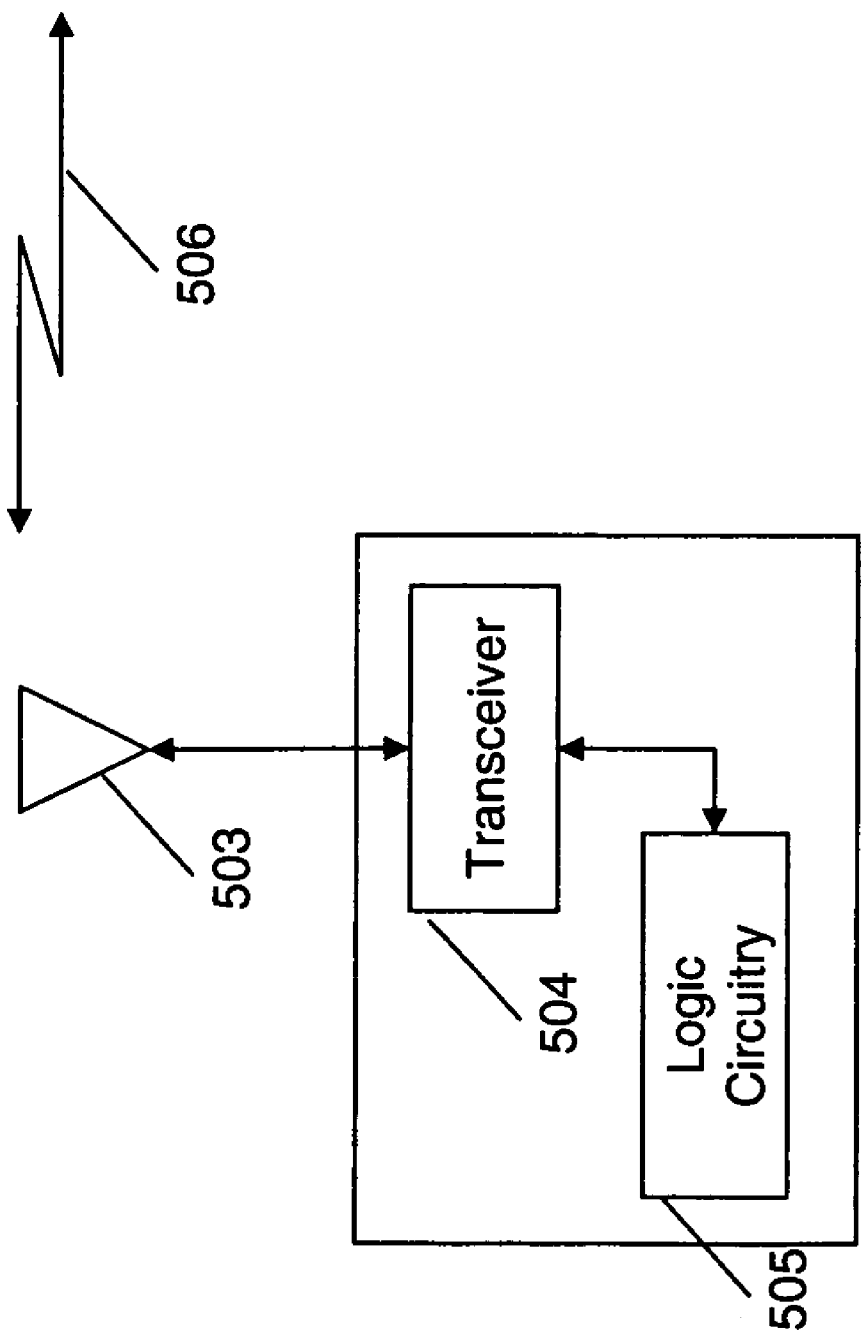
FIG. 5 is a block diagram of a node.

FIG. 5 is a block diagram of node 500. In a preferred embodiment of the present invention node 500 comprises antenna 503 coupled to transmitter/receiver (transceiver) 504, in turn, coupled to logic circuitry 505. Although various forms for antenna 503, transceiver 504, and logic circuitry 505 are envisioned, in a preferred embodiment of the present invention node 500 is formed from a Freescale Inc. MC13192 transceiver 504 coupled to a Motorola HC08 8-bit processor 505. When node 500 wishes to communicate with any other network node, it does so via over-the-air communication signal 506. Node 500 may serve as a routing or non-routing node. Additionally, when acting as a routing node, node 500 may serve to relay data among network nodes.

Figure 6:
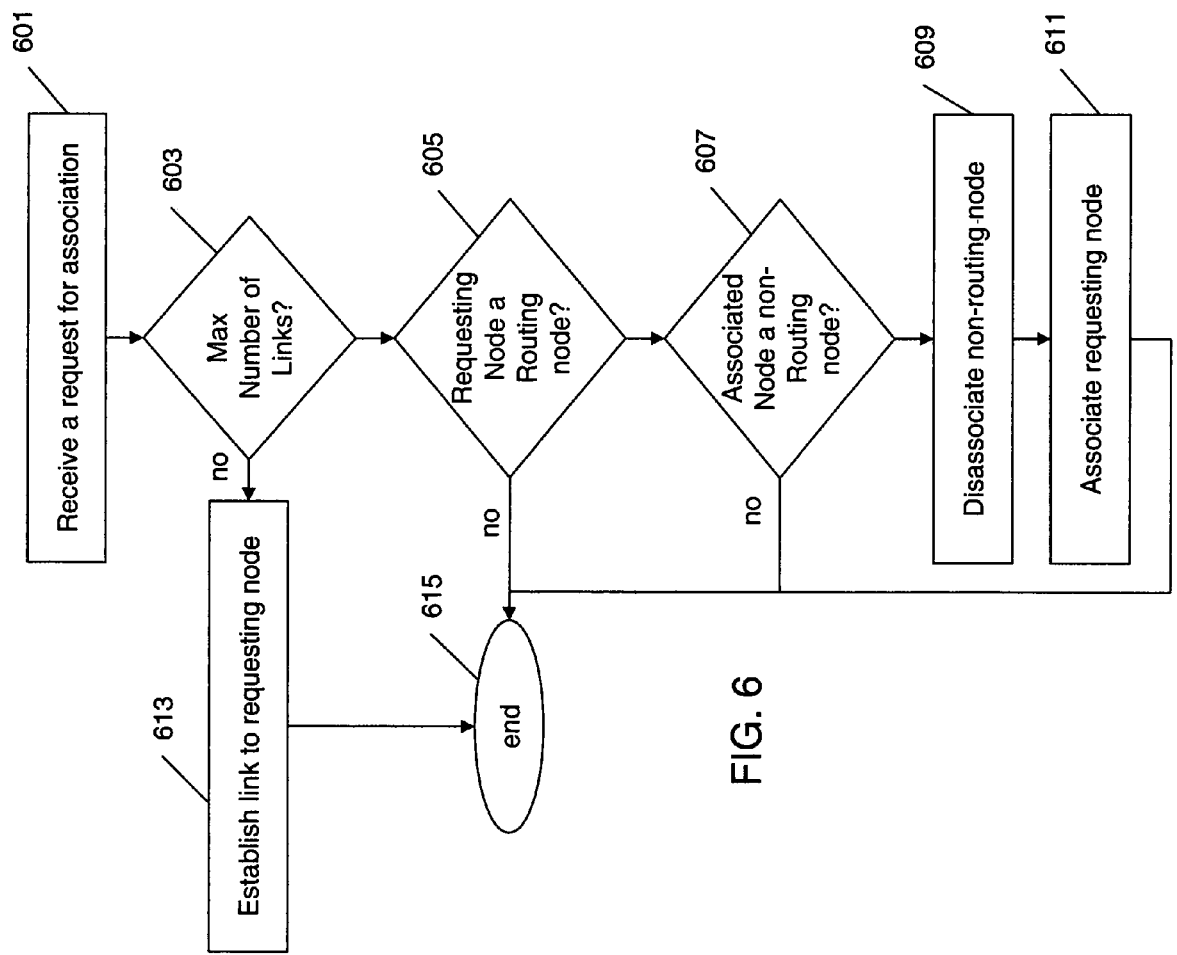
FIG. 6 is a flow chart showing operation of the node of FIG. 5.

FIG. 6 is a flow chart showing operation of the node 500 when acting as a routing node. The logic flow begins at step 601 where transceiver 504 receives an association message (e.g., 802.15.4 Association Message) from a requesting node. The association message is a request from the requesting node to form a communication link (e.g., an ad-hoc communication link) with node 500. As discussed, the request is received via an over-the-air communication. At step 603, logic circuitry 505 determines if a maximum number of links has been obtained, and if not, the logic flow continues to step 613 where a link is established to the requesting node. If, however, at step 603 it is determined that the maximum number of links exist for node 500, the logic flow continues to step 605 where logic circuitry 505 determines if the requesting node is capable of routing. This determination is accomplished by analyzing capability information received with the association message. If, at step 605 it is determined that the requesting node is not capable of routing, the logic flow ends at step 615. However, if at step 605 it is determined that the requesting node is capable of routing, the logic flow continues to step 607 where logic circuitry 505 determines if any associated node is a non-routing node. If, at step 607 it is determined that there exists no non-routing node associated with node 500, the logic flow ends at step 615, otherwise the logic flow continues to step 609.

At step 609 logic circuitry 505 instructs transmitter 504 to transmit a disassociation message to the associated non-routing node, resulting in the non-routing node to disassociate (break communication) with node 500. Next, at step 611, logic circuitry instructs transmitter 504 to transmit an association message to the requesting node, causing the requesting node to form a communication link with node 500.

While the invention has been particularly shown and described with reference to a particular embodiment, it will be understood by those skilled in the art that various changes in form and details may be made therein without departing from the spirit and scope of the invention. For example, it is possible that when a routing capable node attempts to join the network and there are no association slots available, the routing capable node will first scan for a potential routing node and any non-routing nodes. If a non-routing node is found and the node which it is associated with is also found then the requesting node can directly request the non-routing node to leave the current association and join the requesting node after the requesting node takes the non-routing nodes association slot. The benefit of this is to insure that the non-routing node can rejoin the network and the requesting node will not have to query for multiple nodes to associate with. It is intended that such changes come within the scope of the following claims.

The invention claimed is:

1. A method for network formation, the method comprising the steps of:
    receiving a request to form a communication link with a requesting node;
    determining if a maximum number of links has been achieved;
    determining a node to disassociate communication with, wherein the step of determining the node to disassociate communication with is based on whether or not the node is a routing node or a non-routing node, and wherein a routing node is a node capable of routing data and a non-routing node is a node incapable of routing data;
    in response to the request to form the link and the determination that a maximum number of links has been achieved, disassociating communication to the node; and
    forming a communication link with the requesting node.

2. The method of claim 1 wherein the step of receiving the request to form the communication link comprises the step of receiving a request to form an ad-hoc communication link.

3. The method of claim 1 wherein the step of disassociating communication to the node comprises the step of transmitting a disassociation message to the node.

4. The method of claim 1 wherein the step of forming the communication link with the requesting node comprises the step of transmitting a message to the requesting node, instructing the requesting node to form the link.

5. The method of claim 1 further comprising the steps of:
    determining if the requesting node is a routing node.

6. The method of claim 1 further comprising the step of:
    determining if any associated nodes are non-routing nodes.

7. The method of claim 1 wherein only nodes that are non-routing nodes are chosen for disassociation.

8. A method for network formation, the method comprising the steps of:
    receiving a request to form a communication link with a requesting node;
    determining if a maximum number of links has been achieved;
    determining if the requesting node is a routing node;
    determining if any associated nodes are non-routing nodes wherein a routing node is a node capable of routing data and a non-routing node is a node incapable of routing data;
    in response to the determination that any associated nodes are non-routing nodes, breaking communication to a non-routing node; and
    forming a communication link with the requesting node.

9. The method of claim 8 wherein the step of receiving the request to form the communication link comprises the step of receiving a request to form an ad-hoc communication link.

10. The method of claim 9 wherein the step of breaking communication to the non-routing node comprises the step of transmitting a disassociation message to the non-routing node.

11. The method of claim 10 wherein the step of forming the communication link with the requesting node comprises the step of transmitting a message to the requesting node.

12. An apparatus comprising:
   a receiver receiving a request to form a communication link with a requesting node; and
   logic circuitry determining if a maximum number of links has been achieved and in response to the request to form the association link and the determination that the maximum number of links has been achieved, determining a node to disassociate communication with, disassociating communication with the node and forming a communication link with the requesting node, wherein the step of determining the node to disassociate communication with is based on whether or not the node is a routing node or a non-routing node, wherein a routing node is a node capable of routing data and a non-routing node is a node incapable of routing data.

13. The apparatus of claim 12 wherein the request to form the communication link comprises a request to form an ad-hoc communication link.

14. The apparatus of claim 12 wherein the disassociation with the node takes place by the logic circuitry instructing a transmitter to transmit a disassociation message to the node.

15. The apparatus of claim 12 wherein the communication link is formed with the requesting node by transmitting a message to the requesting node.

16. The apparatus of claim 12 wherein only nodes that are non-routing nodes are chosen for disassociation.

* * * * *